(12) United States Patent
Gokan et al.

(10) Patent No.: US 8,240,445 B2
(45) Date of Patent: Aug. 14, 2012

(54) MULTIPLATE CLUTCH AND MOTOR VEHICLE HAVING THE SAME

(75) Inventors: Yoshitsugu Gokan, Wako (JP); Yoshinobu Shiomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1285 days.

(21) Appl. No.: 11/828,005

(22) Filed: Jul. 25, 2007

(65) Prior Publication Data
US 2008/0029332 A1    Feb. 7, 2008

(30) Foreign Application Priority Data
Aug. 2, 2006 (JP) .................................. 2006-210953

(51) Int. Cl.
*F16D 13/54* (2006.01)
(52) U.S. Cl. .................. 192/54.5; 192/89.21; 192/113.5
(58) Field of Classification Search ................ 192/54.5, 192/56.6, 70.23, 89.21, 93 A, 113.5
See application file for complete search history.

(56) References Cited

U.S. PATENT DOCUMENTS

| | | | | |
|---|---|---|---|---|
| 1,559,527 A * | 10/1925 | Spase | ......................... | 192/70.23 |
| 2,045,086 A * | 6/1936 | Kastner | ....................... | 192/55.62 |
| 2,627,955 A * | 2/1953 | Perkins | ....................... | 192/53.31 |
| 2,799,375 A * | 7/1957 | Forster | ....................... | 192/85.42 |
| 4,792,010 A * | 12/1988 | Kitao et al. | ................... | 180/233 |
| 5,496,154 A * | 3/1996 | Hall et al. | ..................... | 417/223 |
| 5,617,938 A * | 4/1997 | Tsukada et al. | ............. | 192/54.5 |
| 5,638,933 A * | 6/1997 | Matsumoto et al. | ......... | 192/52.5 |
| 6,470,659 B2 * | 10/2002 | Shimamura et al. | ........... | 56/14.7 |
| 7,191,882 B2 * | 3/2007 | Kataoka et al. | .............. | 192/54.5 |
| 7,681,705 B2 * | 3/2010 | Okada et al. | .................. | 192/54.5 |
| 2005/0150736 A1 * | 7/2005 | Kataoka et al. | .............. | 192/54.5 |
| 2007/0089961 A1 * | 4/2007 | Ruprecht et al. | ............. | 192/70.2 |
| 2009/0078526 A1 * | 3/2009 | Kawatsu et al. | ........... | 192/70.23 |
| 2009/0321212 A1 * | 12/2009 | Gokan et al. | ............... | 192/70.23 |
| 2010/0078286 A1 * | 4/2010 | Gokan et al. | ............... | 192/70.23 |

FOREIGN PATENT DOCUMENTS

JP    2005-325993    11/2005
JP    2006-132744    5/2006

OTHER PUBLICATIONS

Japanese Office Action for corresponding JP Application No. 2006-210953, Dec. 7, 2010.

* cited by examiner

*Primary Examiner* — David D Le
*Assistant Examiner* — Terry Chau
(74) *Attorney, Agent, or Firm* — Ditthavong Mori & Steiner, P.C.

(57) ABSTRACT

A multiplate clutch includes at least one driving friction plate configured to be rotated by a driving portion, at least one driven friction plate provided to face the at least one driving friction plate and configured to rotate the driven portion, a pressure applying unit configured to apply a pressing force to the at least one driving friction plate and the at least one driven friction plate to transmit the driving force from the driving portion to the driven portion via the at least one driving friction plate and the at least one driven friction plate, a first cam unit including first concave-convex cams and configured to increase the pressing force in accordance with an increase of the driving force, and a second cam unit configured to function as a back torque limiter mechanism and including second concave-convex cams which are different from the first concave-convex cams.

19 Claims, 11 Drawing Sheets

Fig. 10 (a)
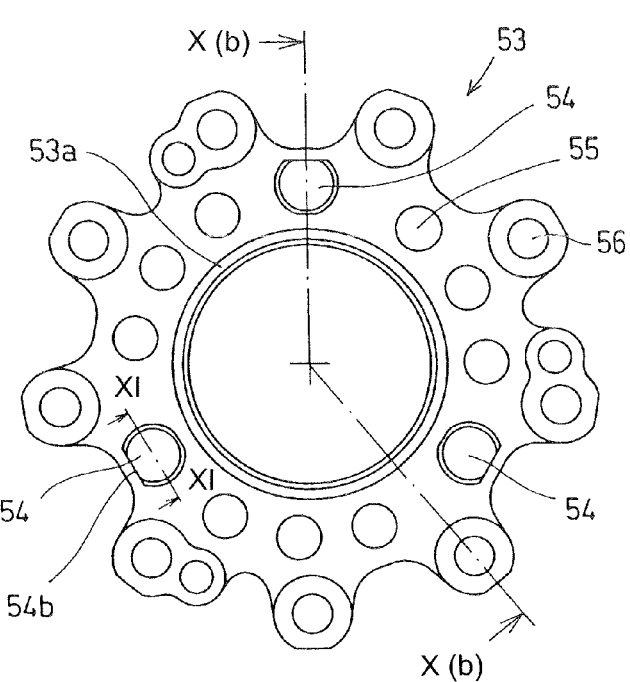
Fig. 10 (b)
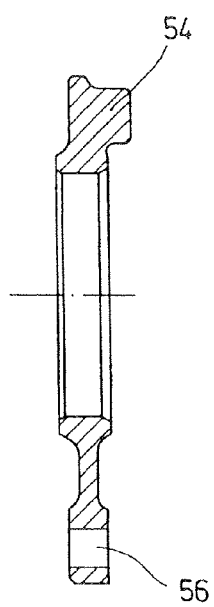
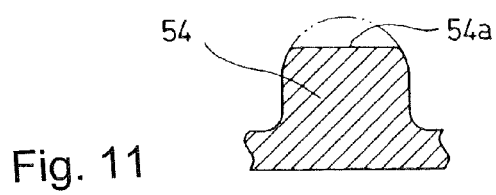
Fig. 11

Page

MULTIPLATE CLUTCH AND MOTOR VEHICLE HAVING THE SAME

CROSS-REFERENCE TO RELATED APPLICATIONS

The present application claims priority under 35 U.S.C. §119 to Japanese Patent Application No. 2006-210953, filed Aug. 2, 2006, entitled "MULTIPLATE CLUTCH." The contents of this application are incorporated herein by reference in their entirety.

BACKGROUND OF THE INVENTION

1. Field of the Invention

The present invention relates to a multiplate clutch and a motor vehicle which includes the multiplate clutch.

2. Discussion of the Background

Japanese Unexamined Patent Application Publication No. 2005-325993 discloses a power transmission device in which a rectangular assist cam, which assists in applying press contact force to a friction plate, and a back torque limiter cam are formed between a pressure plate and a clutch member (see FIG. 1). The contents of this publication are incorporated herein by reference in their entirety. In this power transmission device, contact surfaces, formed at respective sides of the cams, are used to assist in applying the press contact force to the friction plate or to perform sliding of the friction plate between the pressure plate and the clutch member. Japanese Unexamined Patent Application Publication No. 2005-325993 further discloses that a spline groove of a clutch member that engages a driven-side friction plate is formed so as to have a certain angle, and that press-contacting or sliding of the friction plate is performed.

SUMMARY OF THE INVENTION

According to one aspect of the present invention, a multiplate clutch includes a driving portion, a driven portion, at least one driving friction plate, at least one driven friction plate, a pressure applying unit, a first cam unit, and a second cam unit. The driving portion is configured to be rotated by a driving force applied by driving force generator. The driven portion is configured to rotate an output shaft having an axial direction. The at least one driving friction plate is configured to be rotated by the driving portion. The at least one driven friction plate is provided to face the at least one driving friction plate and configured to rotate the driven portion. The pressure applying unit is configured to apply a pressing force to the at least one driving friction plate and the at least one driven friction plate to transmit the driving force from the driving portion to the driven portion via the at least one driving friction plate and the at least one driven friction plate. The first cam unit includes first concave-convex cams and is configured to increase the pressing force in accordance with an increase of the driving force. The second cam unit is configured to function as a back torque limiter mechanism and includes second concave-convex cams which are different from the first concave-convex cams.

According to another aspect of the present invention, a motor vehicle includes an internal combustion engine, a transmission, and a multiplate clutch connected to the internal combustion engine and the transmission. The multiplate clutch includes a driving portion, a driven portion, at least one driving friction plate, at least one driven friction plate, a pressure applying unit, a first cam unit, and a second cam unit. The driving portion is configured to be rotated by a driving force applied by driving force generator. The driven portion is configured to rotate an output shaft having an axial direction. The at least one driving friction plate is configured to be rotated by the driving portion. The at least one driven friction plate is provided to face the at least one driving friction plate and configured to rotate the driven portion. The pressure applying unit is configured to apply a pressing force to the at least one driving friction plate and the at least one driven friction plate to transmit the driving force from the driving portion to the driven portion via the at least one driving friction plate and the at least one driven friction plate. The first cam unit includes first concave-convex cams and is configured to increase the pressing force in accordance with an increase of the driving force. The second cam unit is configured to function as a back torque limiter mechanism and includes second concave-convex cams which are different from the first concave-convex cams.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10(a) is a front view of a surface of a second cam plate 53 facing the first cam plate of the multiplate clutch according to a third embodiment of the present invention;

FIG. 10(b) is a sectional view taken along X(b)-X(b) of FIG. 10(a);

FIG. 11 is an enlarged sectional view taken along Xi-XI of FIG. 10(a);

DESCRIPTION OF THE EMBODIMENTS

Figure 1:
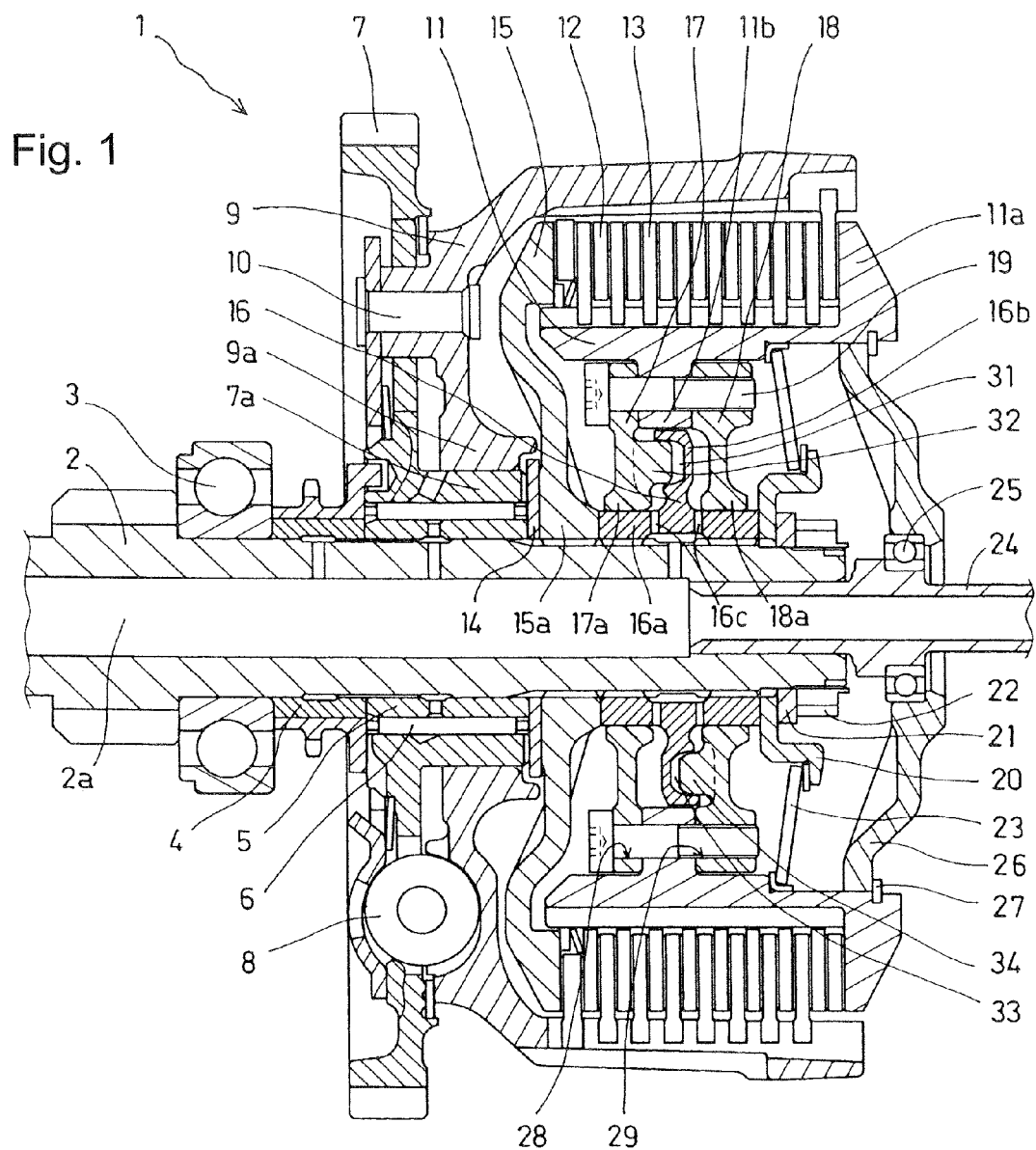
FIG. 1 is a vertical sectional view of a multiplate clutch according to a first embodiment of the present invention.

The embodiments will now be described with reference to the accompanying drawings, wherein like reference numerals designate corresponding or identical elements throughout the various drawings.

FIG. 1 is a vertical sectional view of a multiplate clutch 1 according to a first embodiment of the present invention. The clutch is provided at a rotational power transmission path extending from a crank shaft of an internal combustion engine of a vehicle, for example, a motor bicycle, towards a main shaft of a transmission. A driver operates the clutch to connect or disconnect the crank shaft of an internal combustion engine and the main shaft of a transmission driver.

In FIG. 1, a transmission main shaft (or driven portion) 2 is rotatably supported by a crank case (not shown) through a ball bearing 3. Sleeves 4 and 5 are provided at the transmission main shaft 2 so as to be adjacent to the ball bearing 3. A driven gear (or driving portion) 7 constantly engaging a driving gear of the crank shaft is supported at the outer periphery of the sleeve 5 through a needle bearing 6 so as to be rotatable relative to the transmission main shaft 2. A shock-absorbing member 8 is provided between a body and a toothed portion, provided around the body, of the driven gear 7. A boss 9a of a clutch outer 9 of the multiplate clutch 1 is held at the outer periphery of a boss 7a of the driven gear 7. The clutch outer 9 is connected to a rivet 10 so as to rotate together with the driven gear 7.

A clutch inner 11 is provided at the inner side of the clutch outer 9. A plurality of drive friction plates 12 engages with the clutch outer 9 so as to be rotated by the clutch outer 9 and so as to be axially movable relative to the clutch outer 9. A plurality of driven friction plates 13 engages with the clutch inner 11 so as to rotate the clutch inner 11 and so as to be axially movable relative to the clutch inner 11. The drive friction plates 12 and the driven friction plates 13 are alternately disposed. A pressure plate 11a is integrally formed with the outer end of the clutch inner 11, and contacts the outer ends of the plurality of friction plates. A pressure-receiving plate 15 is provided adjacent to the boss 7a of the driven gear 7 through an annular spacer 14. A boss 15a of the pressure-receiving plate 15 is spline-fitted to and supported by the transmission main shaft 2. The outer periphery of the pressure-receiving plate 15 is in contact with the inner ends of the plurality of friction plates.

A boss 16a of a first cam plate 16 is provided adjacent to the boss 15a of the pressure-receiving plate 15, and is spline-fitted to and supported by the transmission main shaft 2. The first cam plate 16 has an extending portion 16b extending outward in a radial direction of the main shaft 2. Cam mechanisms are formed at respective surfaces of the extending portion.

A second cam plate 17 and a third cam plate 18 form a pair at an inwardly facing flange 11b provided at the inner peripheral portion of the clutch inner 11, and are secured to respective sides of the extending portion 16b of the first cam plate 16 in the axial direction through a bolt 19. A boss 17a of the second cam plate 17 and a boss 18a of the third cam plate 18 are axially slidably fitted to the outer periphery of the boss 16a of the first cam plate 16. In the above-described structure, the clutch inner 11, the second cam plate 17, and the third cam plate 18 can slightly move axially together on respective sides of the extending portion 16b of the first cam plate 16. Cam mechanisms are formed on a surface of the second cam plate 17 facing the extending portion 16b and a surface of the third cam 18 facing the extending portion 16b.

A spring retainer 20 is provided adjacent to the boss 16a of the first cam plate 16, and is spline-fitted to the main shaft 2. A washer 21 and a nut 22 are provided adjacent to the spring retainer 20, and secure the pressure-receiving plate 15, the first cam plate 16, and the spring retainer 20 so as not to be axially movable. A disc spring (or pressing member) 23 is interposed between the clutch inner 11 and the spring retainer 20, and pushes the clutch inner 11 and the pressure plate 11a, integrally formed therewith, towards the pressure-receiving plate 15. This causes the plurality of friction plates 12 and 13 to be press-contacted between the pressure plate 11a and the pressure-receiving plate 15. This state corresponds to a state occurring when the internal combustion engine is stopped and a state occurring when the engine is in normal operation.

An operating rod 24 is fitted to an end portion defining a center hole 2a of the main shaft 2. An operating plate 26 is held at the outer periphery of the operating rod 24 through a ball bearing 25. The outer periphery of the operating plate 26 engages with a fastening ring 27 mounted to the inner periphery of the clutch inner 11. The clutch is disconnected by pulling the operating rod 24 in the outward direction of the clutch against pressing force of the disc spring 23, moving the clutch inner 11 outward, and separating the friction plates 12 and 13 from each other.

In FIG. 1, an assist cam mechanism is formed at the first cam plate 16 and the second cam plate 17. The assist cam mechanism includes assist recess cams 31, provided in the first cam plate 16, and assist protrusion cams 32, provided on the second cam plate 17.

A slipper cam mechanism is formed at the first cam plate 16 and the third cam plate 18. The slipper cam mechanism includes slipper recess cams 33, provided in the first cam plate 16, and slipper protrusion cams 34, provided on the third cam plate 18.

Oil passages 16c are formed in the boss 16a of the first cam plate 16. Therefore, it is possible to lubricate the cam mechanisms by supplying oil from the center hole 2a of the transmission main shaft 2 to a space surrounded by the first, second, and third cam plates and the flange 11b of the clutch inner 11.

FIG. 2(a) is a perspective view of the first cam plate 16, and FIG. 2(b) is a perspective view of the second cam plate 17. FIGS. 2(a) and 2(b) illustrate the forms of the facing surfaces of the cam plates where the assist cams are formed. Six assist recess cams 31 are formed in one surface of the extending portion 16b of the first cam plate 16. Six assist protrusion cams 32 are formed on the surface of the second cam plate 17 facing the recess cams 31. The bottom portions of the recess cams 31 and the top portions of the protrusion cams 32 have spherical shapes.

FIG. 3(a) is a perspective view of the first cam plate 16, and FIG. 3(b) is a perspective view of the third cam plate 18. FIGS. 3(a) and 3(b) illustrate the forms of the facing surfaces of the cam plates where the slipper cams are formed. Three slipper recess cams 33 are formed in the surface, opposite to the surface where the assist recess cams 31 are formed, of the extending portion 16b of the first cam plate 16. Three slipper protrusion cams 34 are formed on a portion of the third cam plate 18 facing the recess cams 33. The bottom portions of the recess cams 33 and the top portions of the protrusion cams 34 have spherical shapes.

Figure 2:
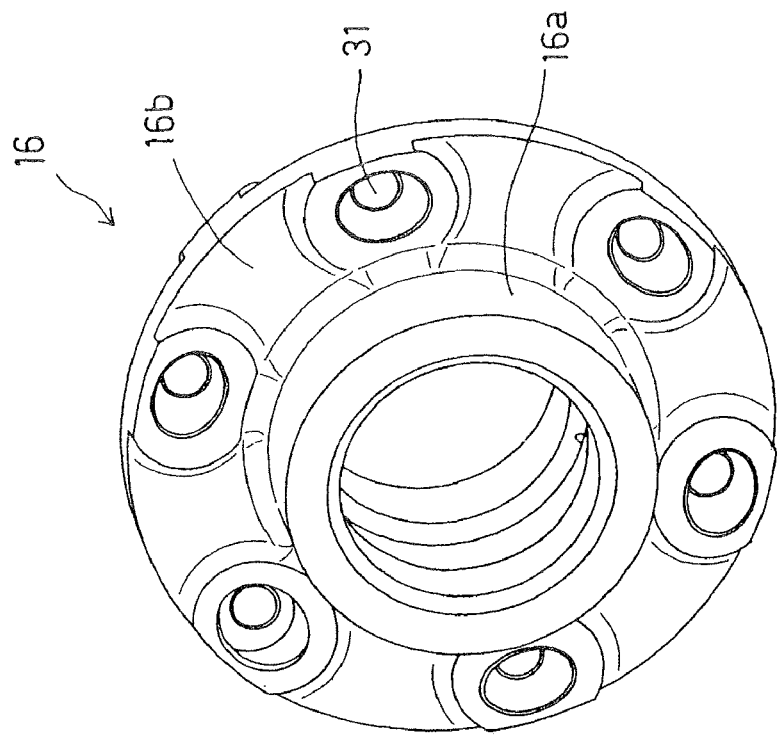
FIG. 2(a) is a perspective view of an assist-recess-cam side of a first cam plate of the multiplate clutch shown FIG. 1.
FIG. 2(b) is a perspective view of an assist-protrusion-cam side of a second cam plate of the multiplate clutch shown FIG. 1.
Figure 2:
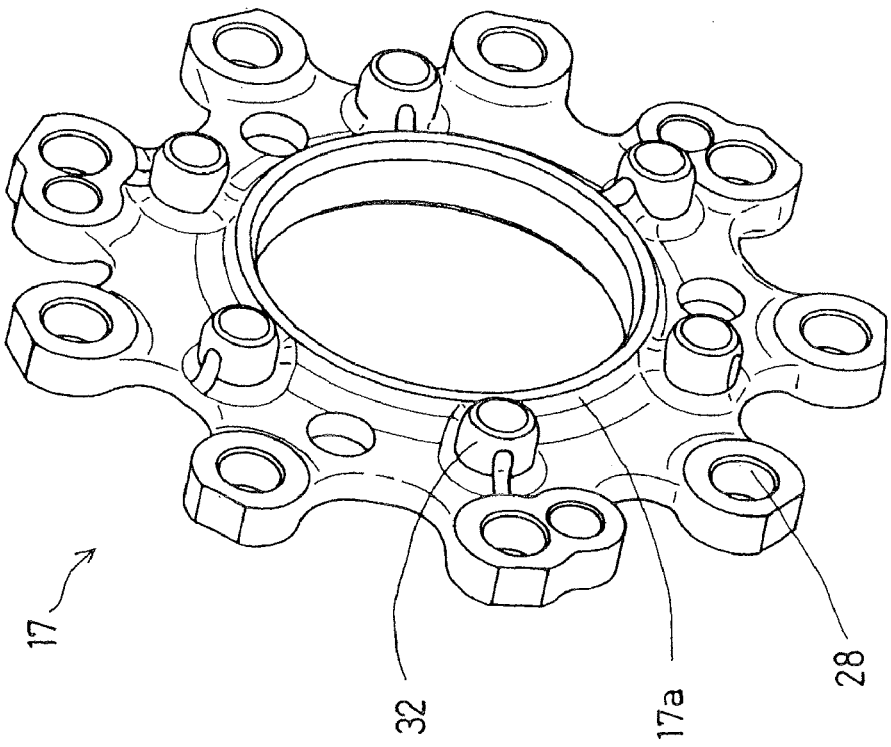
Figure 3:
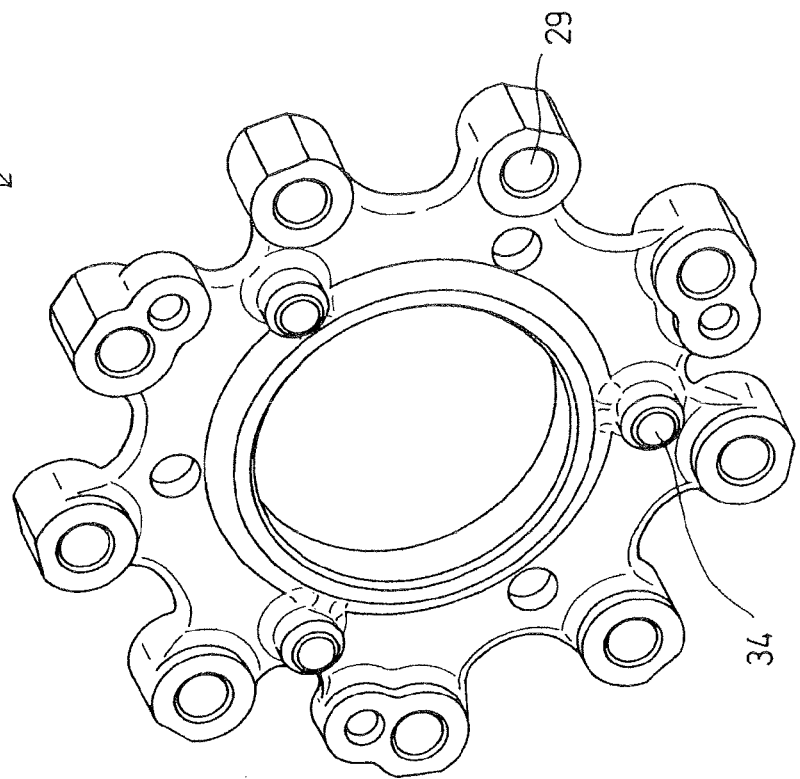
FIG. 3(a) is a perspective view of a slipper-recess-cam side of the first cam plate of the multiplate clutch shown FIG. 1.
FIG. 3(b) is a perspective view of a slipper-protrusion-cam side of a third cam plate of the multiplate clutch shown FIG. 1.
Figure 3:
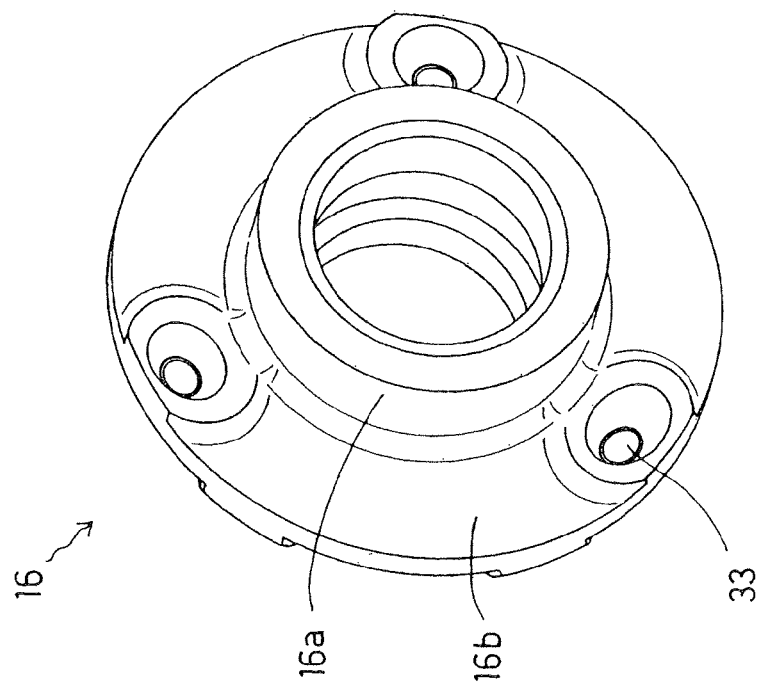

A plurality of holes are formed in the outer periphery of the second cam plate 17 shown in FIG. 2(*b*) and in the outer periphery of the third cam plate 18 shown in FIG. 3(*b*). They are formed for integrally connecting the second cam plate 17, the flange 11*b* of the clutch inner 11, and the third cam plate 18. The holes formed in the outer periphery of the second cam plate 17 are bolt insertion holes 28, and the holes formed in the outer periphery of the third cam plate 18 are bolting threaded holes 29 (refer also to FIG. 1).

Figure 4:
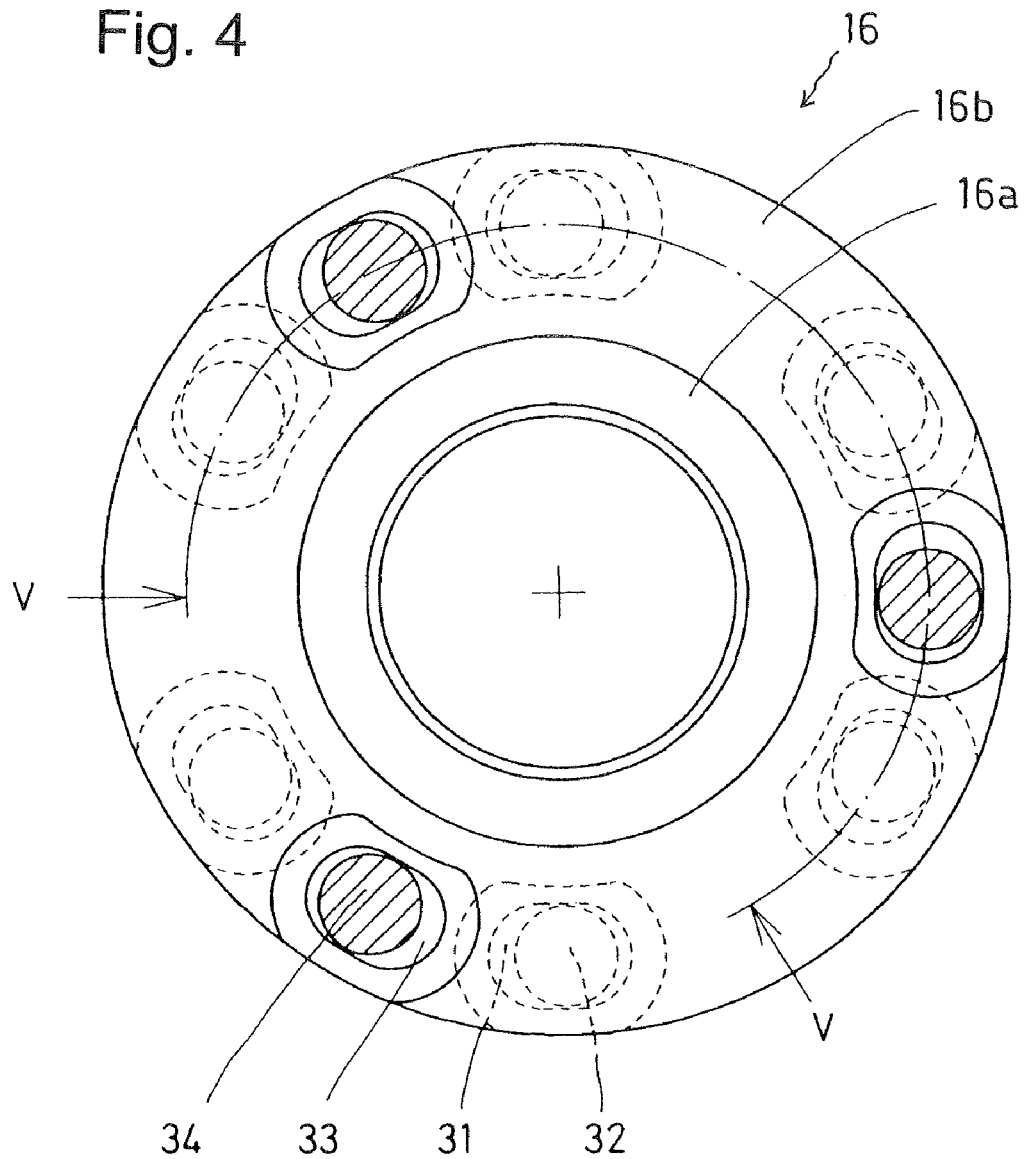
FIG. 4 is a front view of a surface of the first cam plate where slipper recess cams are formed.

FIG. 4 is a front view of the surface of the first cam plate 16 where the slipper recess cams 33 shown in FIG. 3(*a*) are formed. It also shows in cross section the slipper protrusion cams 34 that engage the recess cams 33. The assist recess cams 31, formed in the opposite surface, and the assist protrusion cams 32, which engage the assist recess cams 31, are shown by broken lines. When the plane shown in FIG. 4 is viewed from an axial line direction, the positions of the cams 31 and 33 are displaced from each other in the peripheral direction so that the recess cams 31 and 33 do not overlap each other, as a result of which the extending portion 16*b* of the first cam plate 16 can be made thin.

Figure 5:
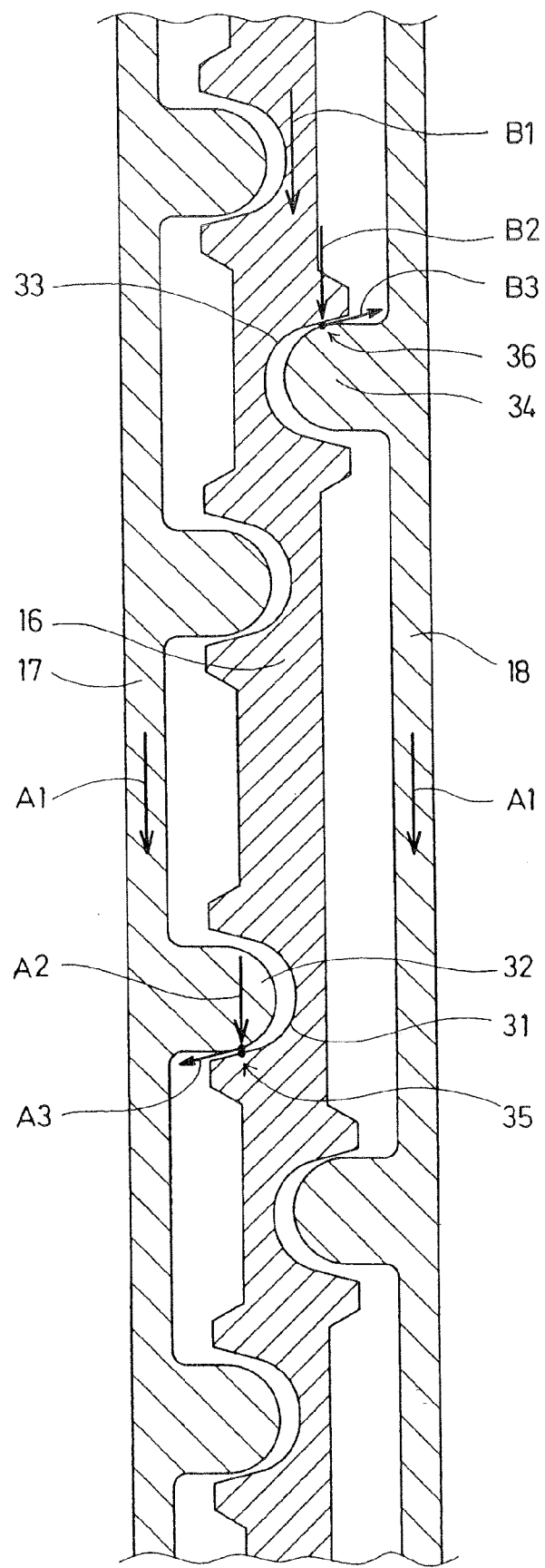
FIG. 5 is a sectional development diagram taken along V-V of FIG. 4.

FIG. 5 is a sectional development diagram taken along V-V of FIG. 4. At respective sides of the first cam plate 16 at the center, the second cam plate 17 and the third cam plate 18 can move together slightly vertically and horizontally in FIG. 5 relative to the first cam plate 16.

In FIG. 1, since, when the internal combustion engine is stopped, the disc spring 23 pushes the clutch inner 11, the drive friction plates 12 and the driven friction plates 13 are press-contacted between the pressure plate 11*a* and the pressure-receiving plate 15. When driving torque from the internal combustion engine is input to the multiplate clutch 1 through the driven gear 7, the clutch outer 9 rotates, so that the drive friction plates 12, engaging the clutch outer 9, the driven friction plates 13, press-contacted against the drive friction plates 12, the clutch inner 11, engaging the driven friction plates 13, and the second cam plate 17 and the third cam plate 18, secured to the clutch inner 11 with the bolt, also rotate.

In FIG. 5, when the rotation starts, a driving torque A1 is applied to the second cam plate 17 and the third cam plate 18, which rotate together as mentioned above. This causes each assist protrusion cam 32, formed on the second cam plate 17, to move in the same direction as the driving torque A1, and to come into contact with an opposing point 35 on one of the inclined surfaces at a peripheral edge defining the corresponding assist recess cam 31 of the first cam plate 16, so that the first cam plate 16 is pushed by a pushing force A2 corresponding to the driving torque A1, and the driving torque A1 is transmitted to the first cam plate 16. This causes the first cam plate 16 to also be driven by the driving torque A1. The driving torque A1 is transmitted to the transmission main shaft 2, spline-fitted to the first cam plate 16, so that the transmission main shaft 2 also rotates by the driving torque A1. The description above illustrates a mechanism for transmitting rotational driving force when the multiplate clutch 1 is in normal operation.

As the driving torque A1 input to the multiplate clutch 1 from the internal combustion engine through the driven gear 7 increases, the pushing force A2, which each assist protrusion cam 32 applies to the opposing point 35 on the corresponding assist recess cam 31, increases. This causes each assist protrusion cam 32, itself, to be pushed in the direction of the inclined surface by a component A3 of the pushing force A2 in the direction of the inclined surface, so that the second cam plate 17 moves in the direction of the component A3 along each inclined surface. At this time, the third cam plate 18 also moves. These movements are transmitted to the clutch inner 11, integrally connected with the bolt, and push the pressure plate 11*a*, integrally formed with the clutch inner 11, in the direction in which the friction plates 12 and 13 are press-contacted. The amount of movement of the second cam plate 17 is determined by an opposing force of the press-contact force from the friction plates. That is, in accordance with the value of the driving torque A1 from the internal combustion engine, the second cam plate 17 moves in the direction of the inclined surfaces of the assist recess cams, so that the pressure plate 11*a* is moved in the direction in which it assists in applying the press-contact force to the friction plates, thereby transmitting the increased driving torque.

In FIG. 5, an arrow B1 illustrates a back torque direction. When the back torque B1, transmitted from the transmission main shaft 2, becomes greater than the driving torque A1, each slipper recess cam 33 moves with respect to the corresponding slit protrusion cam 34 in the same direction as the back torque B1, so that one of the inclined surfaces of a peripheral edge defining the corresponding slipper recess cam 33 comes into contact with an opposing point 36 on the base of the corresponding protrusion cam 3. As a result, the third cam plate 18 is pushed by a pushing force B2 corresponding to the back torque B1 through each slipper protrusion cam 34.

When the back torque B1 increases, the pushing force B2 that the peripheral edge of each slipper recess cam 33 applies to the opposing point 36 of the corresponding slipper protrusion cam 34 is increased. Therefore, an opposing force component B3 of the pushing force B2 in the direction of the inclined surfaces causes the third cam plate 18 to move in the direction of the opposing force component B3 along the inclined surfaces. At this time, the second cam plate 17 also moves. The movements are transmitted to the clutch inner 11, integrally connected with the bolt, and push the pressure plate 11*a*, integrally formed with the clutch inner 11, in the direction in which the friction plates 12 and 13 separate from each other. That is, when the back torque B1 from the transmission main shaft becomes greater than the driving torque A1, the second cam plate 17 and the third cam plate 18 move, so that the press-contact force of the pressure plate 11*a* with respect to the friction plates is reduced to slide the friction plates. Therefore, the slipper cam mechanisms reduce the torque transmission and function as back torque limiters. In addition, they reduce a reverse input torque during deceleration, and reduce engine braking. Therefore, a load applied to a driving system is reduced, and wear resistance of tires is increased.

Figure 6:
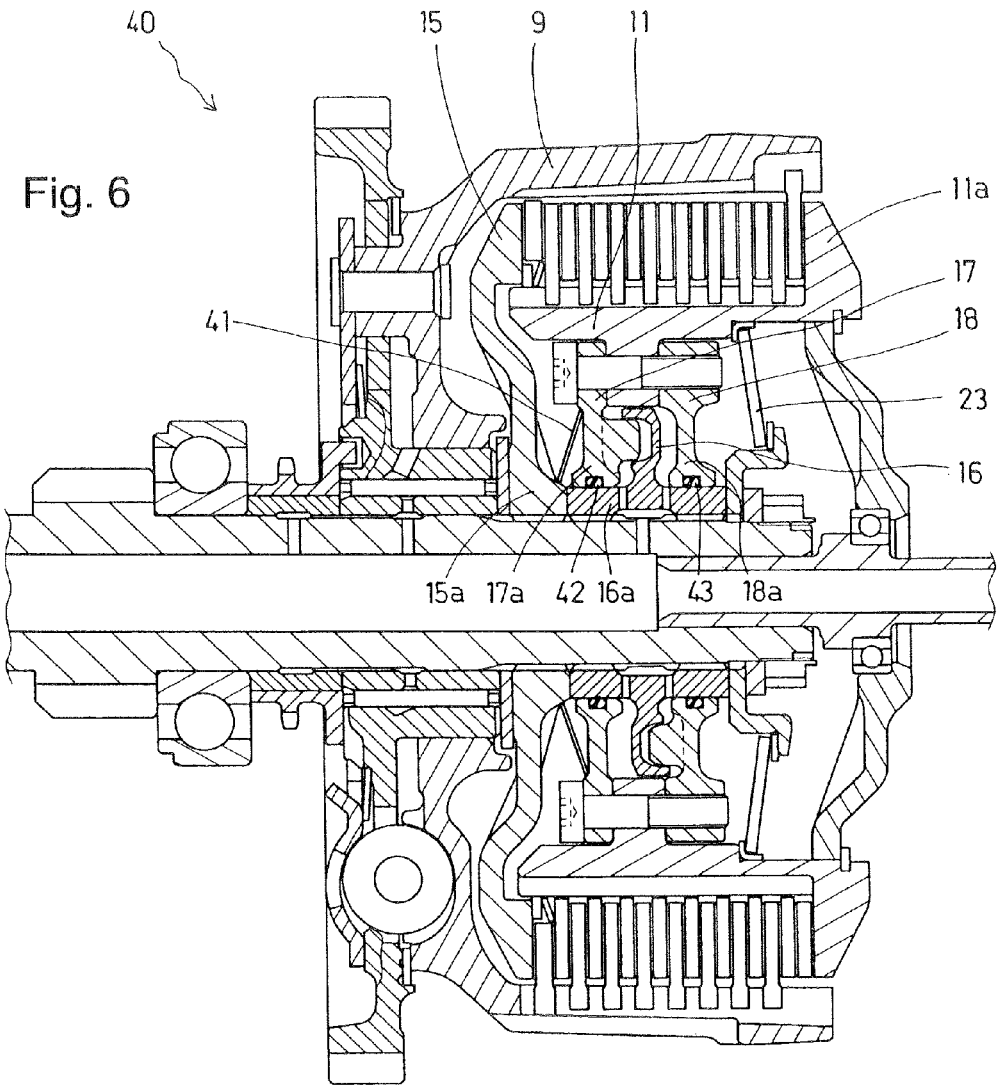
FIG. 6 is a vertical sectional view of a multiplate clutch according to a second embodiment of the present invention.

FIG. 6 is a vertical sectional view of a multiplate clutch 40 according to a second embodiment of the present invention. This embodiment differs from the first embodiment in that a disc spring 41 is interposed between a pressure-receiving plate 15 and a second cam plate 17, an O ring 42 is interposed between a sliding surface of a first cam plate 16 and a sliding surface of the second cam plate 17, and an O ring 43 is interposed between a sliding surface of the first cam plate 16 and a sliding surface of a third cam plate 18.

With a boss 15*a* of the pressure-receiving plate 15 as a base, the disc spring 41 pushes the second cam plate 17 towards the first cam plate 16. This stabilizes the positions of assist cam abutting surfaces. The pressing direction of the disc spring 41 is opposite to the pressing direction of the disc spring 23. Accordingly, by pushing both sides of a clutch inner 11 by the springs, the operation stability of the clutch inner 11 is enhanced. This reduces rattling, so that it is possible to increase tolerance and productivity.

The O ring 42 is interposed between a boss 16a of the first cam plate 16 and a boss 17a of the second cam plate 17, and the O ring 43 is interposed between the boss 16a of the first cam plate 16 and a boss 18a of the third cam plate 18, so that sliding of the sliding surfaces is not that between metals, but between the O ring 42 and the outer surface of the boss 16a of the first cam plate and between the O ring 43 and the outer surface of the boss 16a of the first cam plate. That is, tolerance of the sliding surface of the boss of the first cam plate 16 and the sliding surface of the boss of the second cam plate 17 and tolerance of the sliding surface of the boss of the first cam plate 16 and the sliding surface of the boss of the third cam plate 18 are slightly eased, so that the second cam plate 17 and the third cam plate 18 can be slightly inclined. Therefore, it is possible to make uniform contact of the abutting surfaces of a plurality of protrusion cams with a plurality of recess cams. Consequently, tolerance control of cam mechanisms is eased, so that productivity is increased.

FIGS. 7 to 13 illustrate cams and cam plates according to a third embodiment of the present invention. The vertical sectional view of this embodiment is substantially the same as that of FIG. 1 of the first embodiment. This embodiment differs in the shapes of recess cams and protrusion cams, and in the number of assist cams.

Figure 7:
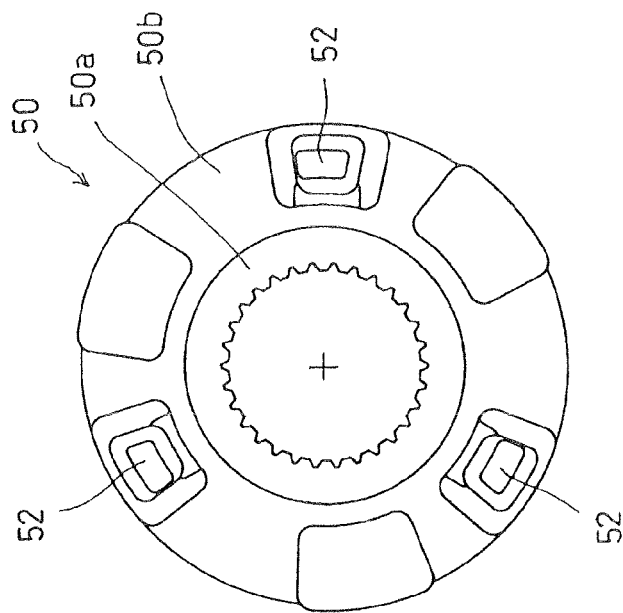
FIG. 7(a) is a front view of an assist side of the first cam plate of the multiplate clutch according to a third embodiment of the present invention.
FIG. 7(b) is a sectional view taken along VII(b)-VII(b) of FIG. 7(a)
FIG. 7(c) is a front view of a slit side taken along VII(c)-VII(c) of FIG. 7(b)
Figure 7:
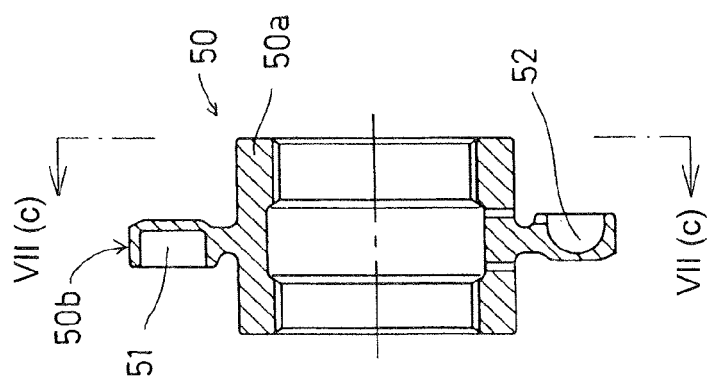
Figure 7:
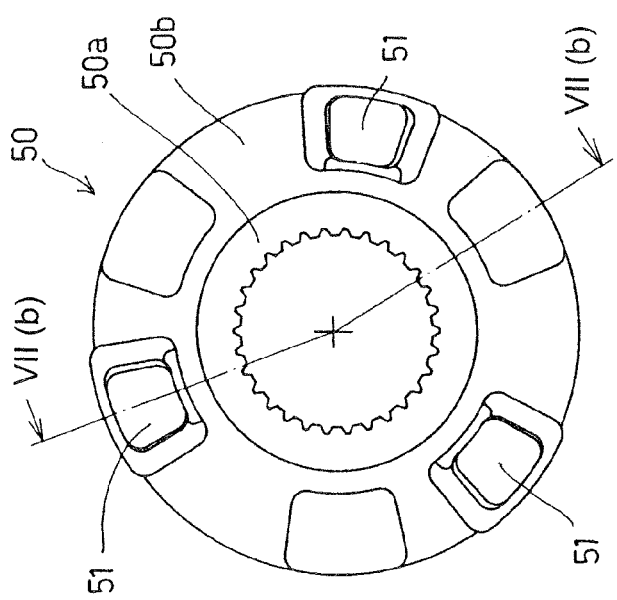

FIG. 7 is a three-view drawing of a first cam plate. FIG. 7(a) is a front view of an assist side of the first cam plate 50. FIG. 7(b) is a sectional view taken along VII(b)-VII(b) of FIG. 7(a). FIG. 7(c) is a front view of a slit side taken along VII(c)-VII(c) of FIG. 7(b). Three assist recess cams 51 are provided in an assist-side surface of an extending portion 50b extending outward in a radial direction of a boss 50a at the central portion of the first cam plate 50, and three slipper recess cams 52 are provided in a slipper-side surface of the extending portion 50b. As can be seen from the figures, the assist recess cams 51 are larger than the slipper recess cams 52.

Figure 8:
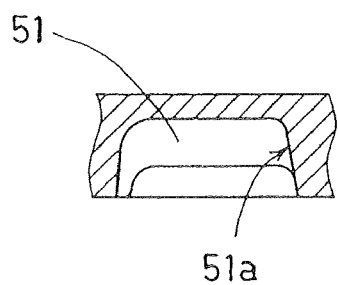
FIG. 8(a) is a front view of the assist recess cam 51 as shown in FIG. 7(a)
FIG. 8(b) is a sectional view taken along VIII(b)-VIII(b) of FIG. 8(a)
FIG. 8(c) is a sectional view taken along VIII(c)-VIII(c) of FIG. 8(a)
Figure 8:
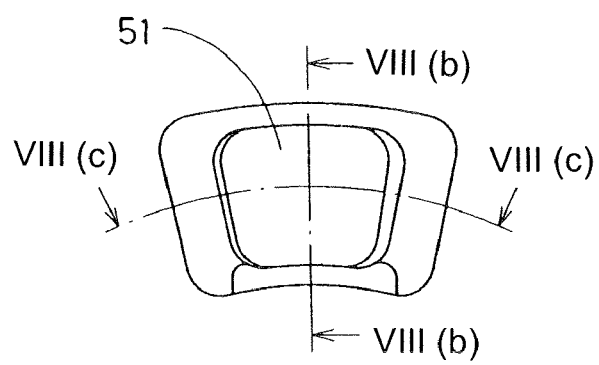
Figure 8:
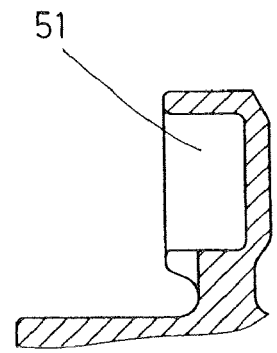

FIG. 8 is an enlarged three-view drawing of the assist recess cam 51. FIG. 8(a) is a front view of the assist recess cam 51. FIG. 8(b) is a sectional view taken along VIII(b)-VIII(b) of FIG. 8(a). FIG. 8(c) is a sectional view taken along VIII(c)-VIII(c) of FIG. 8(a). In the front view of FIG. 8(a), the recess is substantially trapezoidal. Since, in the sectional view of FIG. 8(c), the bottom surface defining the recess is flat, the cross-sectional shape, itself, is substantially trapezoidal. In the sectional view of FIG. 8(b), the recess is substantially rectangular. In the sectional view of FIG. 8(c), an inclined surface 51a for pushing a second cam plate 53 through an assist protrusion cam 54 (described later) is provided on one side. The principle of operation is similar to that of the first embodiment.

Figure 9:
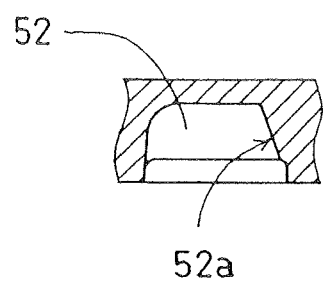
FIG. 9(a) is a front view of the slipper recess cam 52 as shown in FIG. 7(a)
FIG. 9(b) is a sectional view taken along IX(b)-IX(b) of FIG. 9(a)
FIG. 9(c) is a sectional view taken along IX(c)-IX(c) of FIG. 9(a)
Figure 9:
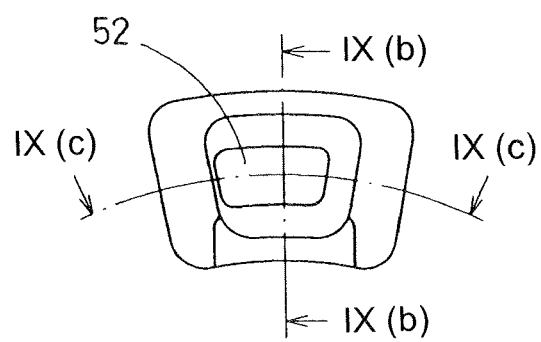
Figure 9:
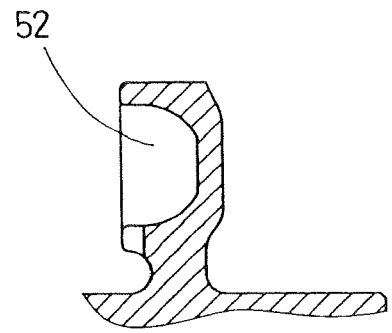

FIG. 9 is an enlarged three-view drawing of the slipper recess cam 52. FIG. 9(a) is a front view of the slipper recess cam 52. FIG. 9(b) is a sectional view taken along IX(b)-IX(b) of FIG. 9(a). FIG. 9(c) is a sectional view taken along IX(c)-IX(c) of FIG. 9(a). In the front view of FIG. 9(a), the recess is substantially trapezoidal. Since, in the sectional view of FIG. 9(c), the bottom surface defining the recess is flat, the cross-sectional shape, itself, is substantially trapezoidal. Although, in the sectional view of FIG. 9(b), the bottom surface defining the recess is flat, it still remains slightly spherical. In the sectional view of FIG. 9(c), an inclined surface 52a for pushing a third cam plate 57 through a slipper protrusion cam 58 (described later) is provided on one side. The principle of operation is similar to that of the first embodiment.

FIG. 10 is a two-view drawing of the second cam plate 53. FIG. 10(a) is a front view of a surface of the second cam plate 53 facing the assist recess cams 51 and having assist protrusion cams 54 formed thereon. FIG. 10(b) is a sectional view taken along X(b)-X(b) of FIG. 10(a). In the second cam plate 53, a boss 53a is fitted to the outer periphery of the boss 50a of the first cam plate 50 so as to be slidable axially, and the assist-protrusion-cam-54 formation surface faces the assist-recess-cam-51 formation surface. The assist protrusion cams 54 are fitted into the assist recess cams 51. Three assist protrusion cams 54 are formed, and three weight-reduction holes 55 each are provided between the assist protrusion cams 54 that are adjacent to each other. Nine bolt insertion holes 56 for connecting to a clutch inner are formed in the outer periphery of the second cam plate.

FIG. 11 is an enlarged sectional view taken along XI-XI of FIG. 10(a). The upper surface of the assist protrusion cam 54 is scraped so as to form a flat surface 54a.

Figure 12:
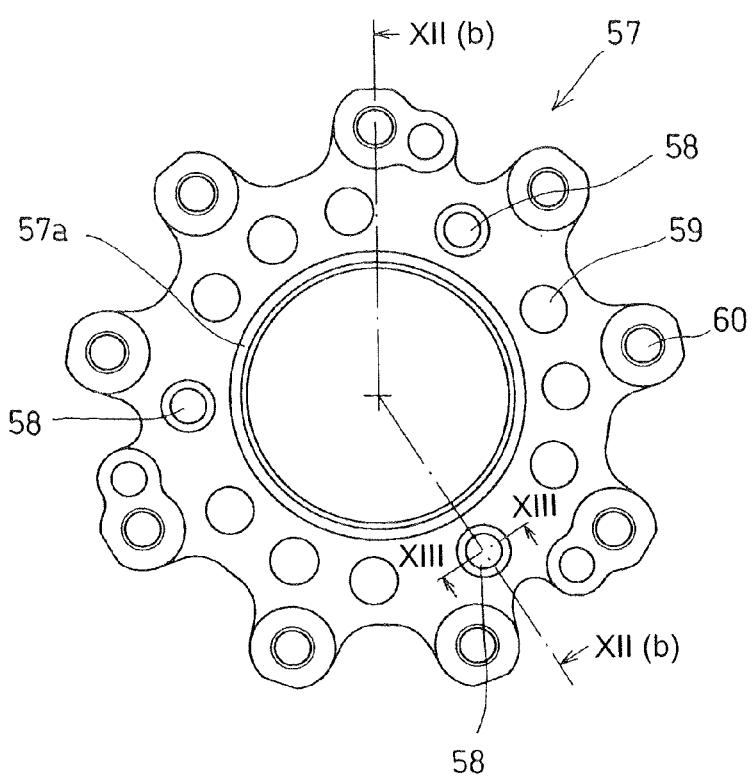
FIG. 12(a) is a front view of a surface of the third cam plate 57 facing the slipper recess cams 52 of the first cam plate of the multiplate clutch according to a third embodiment of the present invention.
FIG. 12(b) is a sectional view taken along XII(b)-XII(b) of FIG. 12(a)
Figure 12:
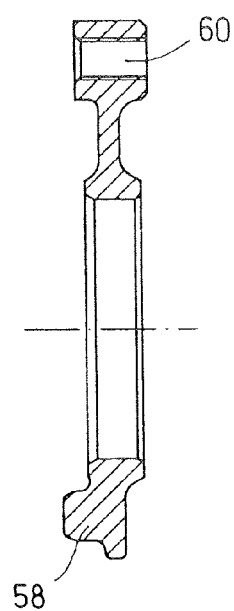

FIG. 12 is a two-view drawing of the third cam plate 57. FIG. 12(a) is a front view of a surface of the third cam plate 57 facing the slipper recess cams 52 and having slipper protrusion cams 58 formed thereon. FIG. 12(b) is a sectional view taken along XII(b)-XII(b) of FIG. 12(a). In the third cam plate 57, a boss 57a is fitted to the outer periphery of the boss 50a of the first cam plate 50 so as to be slidable axially, and the slipper-protrusion-cam-58 formation surface faces the slipper-recess-cam-52 formation surface. The slipper protrusion cams 58 are fitted into the slipper recess cams 52. Three slipper protrusion cams 58 are formed, and three weight-reduction holes 59 each are provided between the slipper protrusion cams 58 that are adjacent to each other. Nine bolting threaded holes 60 for connecting to the clutch inner are formed in the outer periphery of the third cam plate.

Figure 13:
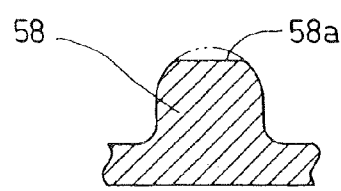
FIG. 13 is an enlarged sectional view taken along XIII-XIII of FIG. 12(a).

FIG. 13 is an enlarged sectional view taken along XIII-XIII of FIG. 12(a). The upper surface of the slipper protrusion cam 58 is scraped so as to form a flat surface 58a. Comparing FIGS. 11 and 13, the assist protrusion cam 54 is larger than the slipper protrusion cam 58. To achieve this, a flat surface 54b is formed at a portion of a side of the assist protrusion cam 54 to make the cam 54 as large as possible.

In the third embodiment, since the assist side and the slipper side are provided with cam mechanisms each using three cams, cam abutting surfaces are made consistent. Since the high-load assist recess cams 51 and assist protrusion cams 54 are larger than the slipper recess cams 52 and slipper protrusion cams 58, durability is increased.

The embodiments according to the present invention described in detail above provide the following advantages.

(1) Since the independent cams achieve respective functions, it is possible to reduce load applied to the cams, and to increase durability. In addition, it is possible to set an operating angle in accordance with a purpose, so that a proper working range can be set.

(2) The cam mechanisms are formed close to the transmission shaft. Therefore, even if the weights of rotating bodies are increased due to the cam mechanisms, the influence on responsiveness to a variation in rotation is small.

(3) Since the number of assist cams that are used for a long time is greater than the number of slipper cams, the durability of the assist cams is increased.

(4) The positions of the recesses of the assist cams and the positions of the recesses of the slipper cams are displaced from each other in the peripheral direction so as not to overlap each other when viewed in the axial direction. Therefore, the outwardly extending portion of the first cam plate can be made thin. Consequently, it is possible to make the multiplate clutch, itself, compact.

(5) Since, by the oil passages in the first cam plate, oil can be supplied to the cam mechanisms, the operating characteristics of the cam mechanisms can be made uniform.

(6) In the second embodiment, since the second cam plate is pressed in the direction of the first cam plate, the positions of cam initial abutting surfaces can constantly be made consistent, and the operating characteristics of the clutch inner can be made uniform.

(7) In the second embodiment, the O rings, provided at the mutually sliding surfaces of the first cam plate and the second cam plate and the mutually sliding surfaces of the first cam plate and the third cam plate, allow the mutually sliding surfaces to be formed into gentle surfaces, so that the abutting surfaces of the cams can be made consistent. In addition, since tolerance control when the cams are manufactured is facilitated, productivity is increased.

(8) In the third embodiment, since the cam mechanisms include three cams, the cam abutting surfaces for all of the cams are made consistent. In addition, since each assist cam having a high load is made large, durability is increased.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A multiplate clutch comprising:
    a driving portion configured to be rotated by a driving force applied by a driving force generator;
    a driven portion configured to rotate an output shaft having an axial direction;
    at least one driving friction plate configured to be rotated by the driving portion;
    at least one driven friction plate provided to face the at least one driving friction plate and configured to rotate the driven portion;
    a pressure applying unit configured to apply a pressing force to the at least one driving friction plate and the at least one driven friction plate to transmit the driving force from the driving portion to the driven portion via the at least one driving friction plate and the at least one driven friction plate;
    a first cam unit comprising first concave-convex cams having spherically shaped portions and configured to increase the pressing force in accordance with an increase of the driving force; and
    a second cam unit configured to function as a back torque limiter mechanism and comprising second concave-convex cams which are different from the first concave-convex cams, the second concave-convex cams having spherically shaped portions,
    wherein the first and second cam units comprise:
        a first cam plate provided to rotate the output shaft,
        a second cam plate provided to be rotated by the driven portion, and
        a third cam plate provided to be rotated by the driven portion, said first cam plate being provided in between the second cam plate and the third cam plate,
    wherein the first concave-convex cams are integrally formed on each of opposing surfaces of the first cam plate and the second cam plate, respectively, and
    wherein the second concave-convex cams are integrally formed on each of opposing surfaces of the first cam plate and the third cam plate, respectively.

2. The multiplate clutch according to claim 1, wherein the pressure applying unit comprises,
    a pressure-receiving plate,
    a pressure-applying plate provided to sandwich the at least one driving friction plate and the at least one driven friction plate between the pressure-receiving plate and the pressure-applying plate, and
    a pressing member configured to press the pressure-applying plate toward the pressure-receiving plate.

3. The multiplate clutch according to claim 1, wherein a number of the first concave-convex cams being larger than a number of the second concave-convex cams.

4. The multiplate clutch according to claim 1, wherein the pressure applying unit comprises a pressing member configured to press the at least one driving friction plate and the at least one driven friction plate, further comprising an additional pressing member configured to press the second cam plate toward the first cam plate along an opposite direction of the pressing force applied by the pressure applying member.

5. The multiplate clutch according to claim 1, further comprising:
    a first elastic member provided at an axially sliding surface along the axial direction between the first cam plate and the second cam plate; and
    a second elastic member provided at an axially sliding surface along the axial direction between the first cam plate and the third cam plate.

6. The multiplate clutch according to claim 1, wherein a size of each of the first concave-convex cams being larger than a size of each of the second concave-convex cams.

7. The multiplate clutch according to claim 6, wherein a number of the first concave-convex cams and a number of the second concave-convex cams are the same.

8. The multiplate clutch according to claim 1, wherein the first cam plate includes first cam recesses of the first concave-convex cams on a first face thereof and second cam recesses of the second concave-convex cams on a second face thereof, positions of the first cam recesses being shifted from positions of the second cam recesses along a circular direction.

9. The multiplate clutch according to claim 1, wherein the back torque limiter mechanism is configured to decrease the pressing force in accordance with an increase of a back torque when the back torque is larger than a driving torque produced by the driving force generator.

10. The multiplate clutch according to claim 1, wherein the driving force generator is an internal combustion engine and the output shaft is connected to a transmission.

11. A multiplate clutch comprising:
    a driving portion configured to be rotated by a driving force applied by a driving force generator;
    a driven portion configured to rotate an output shaft having an axial direction;
    at least one driving friction plate configured to be rotated by the driving portion;
    at least one driven friction plate provided to face the at least one driving friction plate and configured to rotate the driven portion;
    a pressure applying unit configured to apply a pressing force to the at least one driving friction plate and the at least one driven friction plate to transmit the driving force from the driving portion to the driven portion via the at least one driving friction plate and the at least one driven friction plate;
    a first cam unit comprising first concave-convex cams and configured to increase the pressing force in accordance with an increase of the driving force; and a second cam unit configured to function as a back torque limiter mechanism and comprising second concave-convex cams which are different from the first concave-convex cams,
wherein the first and second cam units comprise,
a first cam plate provided to rotate the output shaft,
a second cam plate provided to be rotated by the driven portion,
a third cam plate provided to be rotated by the driven portion, said first cam plate being provided in between the second cam plate and the third cam plate,
wherein the first concave-convex cams are integrally formed on each of opposing surfaces of the first cam plate and the second cam plate, respectively,
wherein the second concave-convex cams are integrally formed on each of opposing surfaces of the first cam plate and the third cam plate, respectively, and
wherein the first cam plate includes at least one oil passage.

12. A motor vehicle comprising:
an internal combustion engine;
a transmission;
a multiplate clutch connected to the internal combustion engine and the transmission, the multiplate clutch comprising:
a driving portion configured to be rotated by a driving force applied by the internal combustion engine;
a driven portion configured to rotate an output shaft connected to the transmission;
at least one driving friction plate configured to be rotated by the driving portion;
at least one driven friction plate provided to face the at least one driving friction plate and configured to rotate the driven portion;
a pressure applying unit configured to apply a pressing force to the at least one driving friction plate and the at least one driven friction plate to transmit the driving force from the driving portion to the driven portion via the at least one driving friction plate and the at least one driven friction plate;
a first cam unit comprising first concave-convex cams having spherically shaped portions and configured to increase the pressing force in accordance with an increase of the driving force; and
a second cam unit configured to function as a back torque limiter mechanism and comprising second concave-convex cams which are different from the first concave-convex cams, the second concave-convex cams having spherically shaped portions,
wherein the first and second cam units comprise:
a first cam plate provided to rotate the output shaft,
a second cam plate provided to be rotated by the driven portion, and
a third cam plate provided to be rotated by the driven portion, said first cam plate being provided in between the second cam plate and the third cam plate,
wherein the first concave-convex cams are integrally formed on each of opposing surfaces of the first cam plate and the second cam plate, respectively, and
wherein the second concave-convex cams are integrally formed on each of opposing surfaces of the first cam plate and the third cam plate, respectively.

13. The motor vehicle according to claim 12, wherein the pressure applying unit comprises,
a pressure-receiving plate,
a pressure-applying plate provided to sandwich the at least one driving friction plate and the at least one driven friction plate between the pressure-receiving plate and the pressure- applying plate, and
a pressing member configured to press the pressure-applying plate toward the pressure- receiving plate.

14. The motor vehicle according to claim 12, wherein the pressure applying unit comprises a pressing member configured to press the at least one driving friction plate and the at least one driven friction plate, further comprising an additional pressing member configured to press the second cam plate toward the first cam plate along an opposite direction of the pressing force applied by the pressure applying member.

15. The motor vehicle according to claim 12, further comprising:
a first elastic member provided at an axially sliding surface along the axial direction between the first cam plate and the second cam plate; and
a second elastic member provided at an axially sliding surface along the axial direction between the first cam plate and the third cam plate.

16. The motor vehicle according to claim 12, wherein a size of each of the first concave-convex cams being larger than a size of each of the second concave-convex cams, and wherein a number of the first concave-convex cams and a number of the second concave-convex cams are the same.

17. The motor vehicle according to claim 12, wherein the first cam plate includes first cam recesses of the first concave-convex cams on a first face thereof and second cam recesses of the second concave-convex cams on a second face thereof, positions of the first cam recesses being shifted from positions of the second cam recesses along a circular direction.

18. The motor vehicle according to claim 12, wherein the back torque limiter mechanism is configured to decrease the pressing force in accordance with an increase of a back torque when the back torque is larger than a driving torque produced by the driving force generator.

19. A motor vehicle comprising:
an internal combustion engine;
a transmission;
a multiplate clutch connected to the internal combustion engine and the transmission, the multiplate clutch comprising:
a driving portion configured to be rotated by a driving force applied by the internal combustion engine;
a driven portion configured to rotate an output shaft connected to the transmission;
at least one driving friction plate configured to be rotated by the driving portion;
at least one driven friction plate provided to face the at least one driving friction plate and configured to rotate the driven portion;
a pressure applying unit configured to apply a pressing force to the at least one driving friction plate and the at least one driven friction plate to transmit the driving force from the driving portion to the driven portion via the at least one driving friction plate and the at least one driven friction plate;
a first cam unit comprising first concave-convex cams and configured to increase the pressing force in accordance with an increase of the driving force; and
a second cam unit configured to function as a back torque limiter mechanism and comprising second concave-convex cams which are different from the first concave-convex cams,
wherein the first and second cam units comprise,
a first cam plate provided to rotate the output shaft,
a second cam plate provided to be rotated by the driven portion, a third cam plate provided to be rotated by the driven portion, said first cam plate being provided in between the second cam plate and the third cam plate, wherein the first concave-convex cams are integrally formed on each of opposing surfaces of the first cam plate and the second cam plate, respectively, and wherein the second concave-convex cams are integrally formed on each of opposing surfaces of the first cam plate and the third cam plate, respectively, and wherein the first cam plate includes at one oil passage.

* * * * *